United States Patent
Eda et al.

(10) Patent No.: US 11,031,038 B2
(45) Date of Patent: Jun. 8, 2021

(54) GLASS SPACER, HARD DISK DRIVE APPARATUS, AND METHOD FOR MANUFACTURING GLASS SPACER

(71) Applicant: HOYA CORPORATION, Tokyo (JP)

(72) Inventors: Shinji Eda, Hung Yen Province (VN); Kinobu Osakabe, Tokorozawa (JP); Yoshitake Tanno, Akishima (JP); Mikio Ikenishi, Akishima (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 16/641,399

(22) PCT Filed: Jan. 31, 2019

(86) PCT No.: PCT/JP2019/003533
§ 371 (c)(1),
(2) Date: Feb. 24, 2020

(87) PCT Pub. No.: WO2019/151459
PCT Pub. Date: Aug. 8, 2019

(65) Prior Publication Data
US 2020/0227087 A1    Jul. 16, 2020

Related U.S. Application Data

(60) Provisional application No. 62/624,987, filed on Feb. 1, 2018.

(30) Foreign Application Priority Data

Dec. 14, 2018 (JP) .............................. JP2018-234741

(51) Int. Cl.
*G11B 17/32* (2006.01)
*G11B 5/73* (2006.01)
(Continued)

(52) U.S. Cl.
CPC .......... *G11B 17/32* (2013.01); *G11B 5/73921* (2019.05); *G11B 17/038* (2013.01); *G11B 33/125* (2013.01)

(58) Field of Classification Search
CPC .... G11B 17/32; G11B 5/73921; G11B 17/038
(Continued)

(56) References Cited

U.S. PATENT DOCUMENTS 5,969,902 A    10/1999  Okumura et al.
2002/0093760 A1*  7/2002  Okunaga ............... G11B 25/043
                                                            360/97.15
(Continued)

FOREIGN PATENT DOCUMENTS

JP    H09-44969 A      2/1997
JP    2001-155460 A    6/2001
(Continued)

OTHER PUBLICATIONS

International Search Report in PCT/JP2019/003533 dated Mar. 26, 2019.

*Primary Examiner* — Allen T Cao
(74) *Attorney, Agent, or Firm* — Global IP Counselors, LLP

(57) ABSTRACT

A glass material of a glass spacer has a surface resistivity of $10^3$ to $10^9$ (Ω/sq) at 22 (° C.). The surface resistivity of a surface of the glass material of the glass spacer at 22 (° C.) is lower than the surface resistivity of an inner portion of the glass material at 22 (° C.). The glass spacer contains at least one oxide selected from the group consisting of $TiO_2$, $Nb_2O_5$, $WO_3$, and $Bi_2O_3$, as a glass component.

20 Claims, 2 Drawing Sheets

(51) Int. Cl.
*G11B 17/038* (2006.01)
*G11B 33/12* (2006.01)

(58) Field of Classification Search
USPC .................................................. 360/98.08
See application file for complete search history.

(56) References Cited

U.S. PATENT DOCUMENTS

| | | | |
|---|---|---|---|
| 2003/0175471 A1* | 9/2003 | Kaneko | G11B 17/038 428/66.4 |
| 2003/0179494 A1* | 9/2003 | Kaneko | G11B 17/028 360/98.08 |
| 2005/0095461 A1* | 5/2005 | Matsumoto | G11B 33/148 428/841.3 |
| 2007/0111041 A1 | 5/2007 | Okumura et al. | |
| 2010/0040907 A1* | 2/2010 | Takizawa | G11B 5/82 428/826 |
| 2010/0182716 A1* | 7/2010 | Bandic | G11B 20/10527 360/75 |
| 2014/0033768 A1 | 2/2014 | Isono et al. | |
| 2015/0255103 A1* | 9/2015 | Ueda | G11B 5/7315 428/836 |

FOREIGN PATENT DOCUMENTS

| | | | |
|---|---|---|---|
| JP | 2001-307452 A | | 11/2001 |
| JP | 2003-059224 A | | 2/2003 |
| JP | 2003-288766 A | | 10/2003 |
| JP | 2003-308672 A | | 10/2003 |
| JP | 2005347171 A | * | 12/2005 |
| JP | 2012-084206 A | | 4/2012 |
| JP | 2016-194970 A | | 11/2016 |

* cited by examiner

GLASS SPACER, HARD DISK DRIVE APPARATUS, AND METHOD FOR MANUFACTURING GLASS SPACER

CROSS-REFERENCE TO RELATED APPLICATIONS

This U.S. National stage application of International Patent Application No. PCT/JP2019/003533, filed on Jan. 31, 2019, claims priority to U.S. Provisional Application No. 62/624,987, filed on Feb. 1, 2018 and Japanese Patent Application No. 2018-234741, filed in Japan on Dec. 14, 2018. The entire contents of U.S. Provisional Application No. 62/624,987 and Japanese Patent Application No. 2018-234741 are hereby incorporated herein by reference.

BACKGROUND

Field of the Invention

The present invention relates to a ring-shaped glass spacer to be arranged in contact with a magnetic disk in a magnetic recording hard disk drive apparatus, a hard disk apparatus in which the glass spacer is used, and a method for manufacturing the glass spacer.

Background Information

Following the expansion of cloud computing in recent years, many hard disk drive apparatuses (hereinafter also referred to as "HDD apparatuses") are used in a data center for a cloud in order to increase the storage capacity.

In an HDD apparatus, ring-shaped spacers are provided between magnetic disks installed in the HDD apparatus in order to keep the magnetic disks in a state of being spaced apart from each other. These spacers function to keep the magnetic disks from coming into contact with each other and precisely arrange the magnetic disks at predetermined positions spaced apart from each other. As materials of these spacers, metallic materials that pose low manufacturing cost are conventionally used.

Incidentally, the spacers and the magnetic disks are in contact with each other, and accordingly, if glass substrates are used as substrates of the magnetic disks, as the temperature inside the HDD apparatus changes, the magnetic disks warp due to a difference in thermal expansion between the spacers made of metal and the magnetic disks made of glass, and floating properties of magnetic heads are consequently impaired. Impairment of floating properties of the magnetic heads is not desirable from the standpoint of reading and writing performed by the hard disk apparatus. Therefore, in order to reduce the difference in thermal expansion, use of spacers made of glass (hereinafter referred to as "glass spacers") has been considered in recent years for cases in which glass substrates are used as substrates of the magnetic disks.

However, glass is generally an insulator, and therefore static electricity is likely to accumulate on the magnetic disks or the glass spacers as a result of friction occurring between air and the magnetic disks and the glass spacers rotating at a high speed. If the magnetic disks or the spacers are charged, foreign matter or minute particles are likely to be adsorbed, and recording elements or reproducing elements of the magnetic heads may break as a result of the accumulated static electricity being discharged to the magnetic heads, and this is not desirable.

A spacer is known that is obtained by etching a surface of the spacer using an etching solution, and thereafter forming a conductive coating on the surface of the spacer (JP 2003-308672A).

It is described that charging of magnetic disks and spacers can be suppressed with this configuration to suppress adsorption of foreign matter and minute particles.

SUMMARY

However, there are problems in that, if the conductive coating is formed on the surface of the spacer using a general electroless plating method, adhesiveness is insufficient and the ability to prevent the generation of dust is insufficient. Also, there are problems in that the manufacturing process of the spacer is troublesome and the manufacturing cost increases.

On the other hand, there is a demand for increasing the storage capacity of HDD apparatuses, as compared with that achieved by conventional techniques, in order to increase the storage capacity of a data center for a cloud.

Currently used magnetic disks are configured to make the float distance between a magnetic head and a magnetic disk extremely small in order to be able to install many magnetic disks in an HDD apparatus, but the above-described demand for increasing the storage capacity of HDD apparatuses is not sufficiently satisfied. Therefore, consideration can be given to increasing the number of magnetic disks that are installed in an HDD apparatus.

If the number of magnetic disks is increased, there is an increase in the likelihood that recording elements or reproducing elements of magnetic heads will break as a result of static electricity accumulated on the magnetic disks being discharged to the magnetic heads, and there also is an increase in the likelihood that a larger amount of foreign matter or minute particles will be adsorbed to the magnetic disks and the spacers as a result of the magnetic disks and the spacers being charged.

Therefore, an object of the present invention is to provide a glass spacer that can suppress charging of a magnetic disk installed in an HDD apparatus and the glass spacer, in order to suppress discharge of static electricity accumulated on the magnetic disk to a magnetic head or in order to suppress adsorption of foreign matter and minute particles to the magnetic disk, and also provide a hard disk drive apparatus in which the glass spacer is used and a method for manufacturing the glass spacer.

One aspect of the present invention is a ring-shaped glass spacer to be arranged in contact with a magnetic disk in a hard disk drive apparatus,
  wherein a glass material of the glass spacer has a surface resistivity of $10^3$ to $10^9$ [$\Omega$/sq] at 22 [° C.].

Another aspect of the present invention is also a ring-shaped glass spacer to be arranged in contact with a magnetic disk in a hard disk drive apparatus,
  wherein a surface resistivity of a surface of a glass material of the glass spacer at 22 [° C.] is lower than a surface resistivity of an inner portion of the glass material at 22 [° C.].

The glass material of the glass spacer preferably has a surface resistivity of $10^3$ to $10^9$ [$\Omega$/sq] at 22 [° C.].

The glass spacer preferably contains at least one oxide selected from the group consisting of $TiO_2$, $Nb_2O_5$, $WO_3$, and $Bi_2O_3$, as a glass component.

The glass spacer preferably contains:

$P_2O_5$;

$Li_2O$ or $Na_2O$; and at least one oxide selected from the group consisting of $TiO_2$, $Nb_2O_5$, $WO_3$, and $Bi_2O_3$.

A surface roughness Ra of a main surface of the glass spacer that comes into contact with the magnetic disk is preferably not larger than 1.0 [μm].

A surface roughness Rz of an outer circumferential edge surface of the glass spacer that does not come into contact with the magnetic disk is preferably at least 1.5 [μm].

The surface roughness Rz of the outer circumferential edge surface is preferably not larger than 20 [μm].

Preferably, grooves that extend along an outer circumference of the glass spacer are formed in an outer circumferential edge surface of the glass spacer that does not come into contact with the magnetic disk.

A skewness of an outer circumferential edge surface of the glass spacer that does not come into contact with the magnetic disk is preferably not larger than 1.2.

Another aspect of the present invention is a hard disk drive apparatus that includes the glass spacer and the magnetic disk.

The magnetic disk preferably includes a glass substrate and a magnetic film that is formed on the glass substrate.

A surface roughness Ra of a main surface of the magnetic disk is preferably not larger than 0.3 [nm].

Preferably, eight or more said magnetic disks are installed in the hard disk drive apparatus.

Another aspect of the present invention is a method for manufacturing a ring-shaped glass spacer to be arranged in contact with a magnetic disk in a hard disk drive apparatus, the method including manufacturing a glass spacer blank that is a blank for the glass spacer and reducing a surface resistivity of a surface of the glass spacer blank by performing reduction treatment on the surface.

The glass spacer preferably contains at least one oxide selected from the group consisting of $TiO_2$, $Nb_2O_5$, $WO_3$, and $Bi_2O_3$, as a glass component.

The glass spacer preferably contains:

$P_2O_5$;

$Li_2O$ or $Na_2O$; and at least one oxide selected from the group consisting of $TiO_2$, $Nb_2O_5$, $WO_3$, and $Bi_2O_3$.

With the above-described glass spacer, hard disk drive apparatus, and method for manufacturing a glass spacer, charging of the magnetic disk and the glass spacer can be suppressed.

DETAILED DESCRIPTION OF THE EMBODIMENTS

The following describes a glass spacer, a hard disk drive apparatus, and a method for manufacturing a glass spacer according to the present invention in detail.

Figure 1:
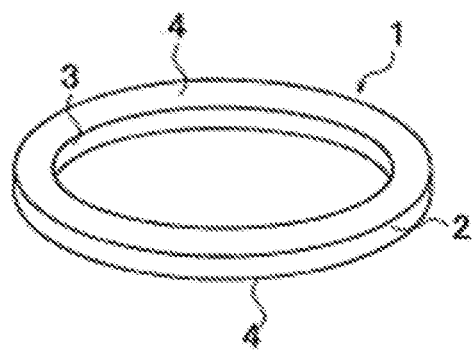
FIG. 1 is an external perspective view of a spacer according to one embodiment.
Figure 2:
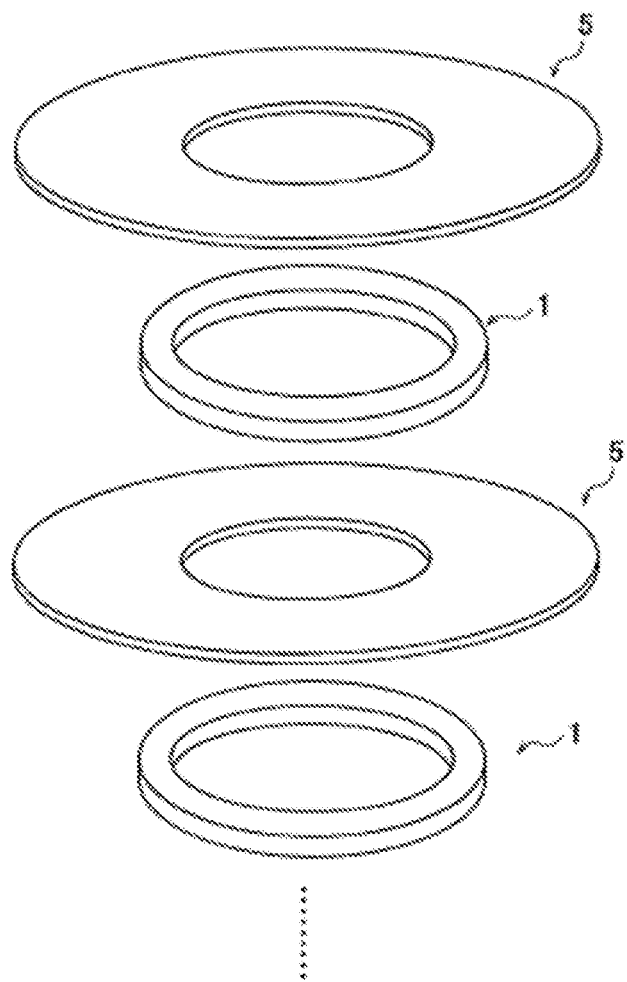
FIG. 2 is a diagram showing an arrangement of spacers according to one embodiment and magnetic disks.
Figure 3:
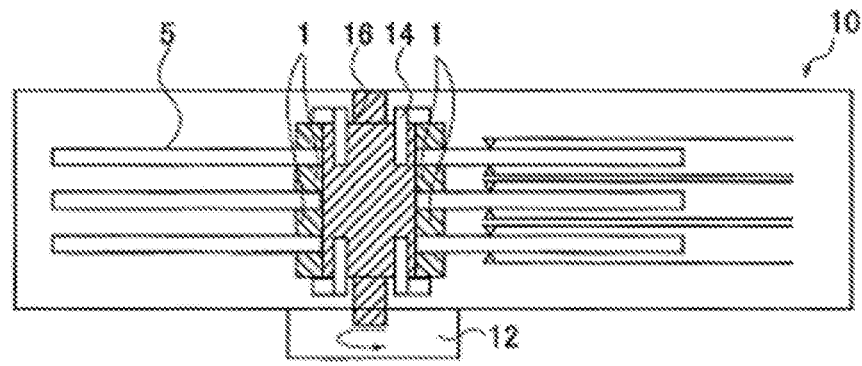
FIG. 3 is a cross-sectional view showing a main portion of an exemplary structure of an HDD apparatus in which spacers according to one embodiment are installed.

FIG. 1 is an external perspective view of a glass spacer (hereinafter simply referred to as a "spacer") 1 according to one embodiment, and FIG. 2 is a diagram showing an arrangement of spacers 1 and magnetic disks 5. FIG. 3 is a cross-sectional view showing a main portion of an exemplary structure of an HDD apparatus in which the spacers 1 are installed.

The spacers 1 are installed in an HDD apparatus by alternately stacking the magnetic disks 5 and the spacers 1 on each other as shown in FIG. 2. As shown in FIG. 3, the plurality of magnetic disks 5 are fitted to a spindle 14 that is connected to a motor 12 and rotates, such that the spindle 14 passes through the magnetic disks 5 and the spacers 1 are interposed between the magnetic disks 5, and the magnetic disks 5 are fixed using a screw via a top clamp 16 that is located above the magnetic disks 5, and thus the magnetic disks 5 are attached at predetermined intervals.

As shown in FIG. 2, the spacers 1 and the magnetic disks 5 are alternately arranged such that one spacer 1 is located between two magnetic disks 5, and the spacers 1 keep a gap between adjacent magnetic disks 5 at a predetermined distance. It should be noted that, although the spacer 1 described in the following embodiment is provided between two magnetic disks 5 while being in contact therewith, the present invention also applies to a spacer that is in contact with only the uppermost or lowermost magnetic disk 5. It should be noted that there is a case in which the spacer 1 that is in contact with only the uppermost or lowermost magnetic disk 5 is not provided, according to the specifications of the HDD apparatus.

As shown in FIG. 1, the spacer 1 has a ring shape and includes an outer circumferential edge surface 2, an inner circumferential edge surface 3, and main surfaces 4 that are opposite to each other.

The inner circumferential edge surface 3 is a surface that comes into contact with the spindle 14, and is a wall surface that surrounds a hole that has an inner diameter that is slightly larger than the outer diameter of the spindle 14.

The main surfaces 4 are two surfaces that are parallel to each other and come into contact with the magnetic disks 5. The spacer 1 fixes the magnetic disks 5 using a frictional force while being in close contact with the magnetic disks 5. As described above, the spacer 1 and the magnetic disks 5 are in contact with each other, and accordingly, as the temperature inside the HDD apparatus changes, the spacer 1 and the magnetic disks 5 are displaced relative to each other due to a difference in thermal expansion between the spacer 1 and the magnetic disks 5, and rub against each other. As a result, static electricity is likely to be generated on the glass, which is an insulator. Also, static electricity is likely to be generated on the spacer 1 as a result of friction occurring between air and the spacer 1 rotating at a high speed. If the spacer 1 is charged with static electricity generated on the spacer 1 as described above, foreign matter or minute particles are likely to be adsorbed, and a recording element or a reproducing element of a magnetic head may break as a result of the accumulated static electricity being discharged to the magnetic head, which is not desirable.

Therefore, glass that has low surface resistivity, takes on a small charge amount, and is unlikely to accumulate static electricity is used for the spacer 1. Static electricity generated on the spacer 1 diffuses and flows via the spindle 14, which is conductive, to an external portion (a grounded portion). Accordingly, even if static electricity is generated on the magnetic disks 5, the static electricity flows via the spacer 1 and the conductive spindle 14 to the external portion (the grounded portion), as well as flowing from the magnetic disks 5 via the spindle 14 to the external portion, and therefore is unlikely to accumulate. Thus, charging of the spacer 1 and the magnetic disks 5 in contact with the spacer 1 can be suppressed.

Such a glass material can be obtained by defining the composition of glass or performing reduction treatment on a surface of a glass spacer blank from which the spacer 1 is to be obtained as described later.

According to one aspect of the spacer 1, the glass material of the spacer 1 has a surface resistivity of $10^3$ to $10^9$ [Ω/sq] at 22 [° C.].

The surface resistivity is measured using a four-point probe method (in accordance with JIS K7194) or a double ring method shown in FIG. 4 described below. Although either of the two measurement methods can be used, it is preferable to use the four-point probe method when glass to be measured has a resistance of $10^3$ to $10^6$ [Ω] and use the double ring method when glass to be measured has a resistance of $10^6$ to $10^9$ [Ω], in terms of precisely determining the surface resistivity. In the four-point probe method, a current is passed between two outer side terminals of four continuously arranged terminals and a voltage between two inner side terminals is measured to obtain information regarding resistance.

Figure 4:
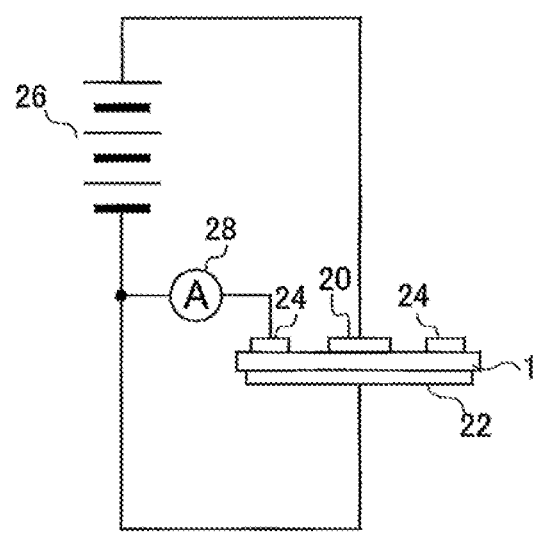
FIG. 4 is a diagram showing measurement of the surface resistivity of a spacer according to one embodiment.

FIG. 4 is a diagram showing measurement (double ring method) of the surface resistivity of the spacer 1. It should be noted that, if the surface resistivity of the spacer 1 cannot be directly measured, a test piece that has the same glass composition and the same thickness as the spacer 1 and has been subjected to the same treatment as the spacer 1 may be measured instead of the spacer 1, using the method shown in FIG. 4. The surface resistivity measured using the test piece can be considered as being the surface resistivity of the spacer 1.

In measurement of the surface resistivity, as shown in FIG. 4, a circular main electrode 20 is provided on an upper surface of the spacer 1 (or the test piece), a circular counter electrode 22 is provided on a lower surface of the spacer 1, and an annular electrode 24 is further provided on the upper surface of the spacer 1 such that the annular electrode 24 surrounds the main electrode 20 and the central position of the annular electrode 24 matches the central position of the main electrode 20. Voltage of a DC power source 26 is applied between the main electrode 20 and the counter electrode 22, and a current flowing through a wire that connects the annular electrode 24 to a wire connecting the DC power source 26 and the counter electrode 22 to each other is measured using an ammeter 28. A surface resistivity $\rho_s$ [Ω/sq] is calculated using the following equation (1) in which resistance $R_s$ [Ω] is a value obtained by dividing the voltage (100 [V]) applied between the main electrode 20 and the counter electrode 22 by the current value measured by the ammeter 28.

$$\text{Surface resistivity } \rho_s = \pi \cdot (D+d)/(D-d) \cdot R_s \quad (1)$$

Here, D represents the inner diameter [mm] of the annular electrode 24, d represents the diameter [mm] of the main electrode 20, and π represents the ratio of the circumference of a circle to its diameter. For example, if a test piece of 45 mm×50 mm×10 mm is used, D=38.1 mm, d=25.4 mm, the outer diameter of the annular electrode 24 is 50.8 mm, and the diameter of the counter electrode 22 is 50 mm. The main electrode 20, the counter electrode 22, and the annular electrode 24 are formed using a conductive paste.

If the surface resistivity is higher than $10^9$ [Ω/sq], charging of the spacer 1 is not sufficiently suppressed, and if the surface resistivity is lower than $10^3$ [Ω/sq], the amount of conductive components included in the glass composition is too large and the surface of the glass is likely to be oxidized, and therefore weather resistance is insufficient. Also, if the surface resistivity is lower than $10^3$ [Ω/sq], there is a risk that micro-arcing will occur when the spacer 1 is attached or detached. If the surface resistivity is $10^3$ to $10^9$ [Ω/sq], even if static electricity is generated on the spacer 1 due to friction between air and the spacer 1 rotating at a high speed or even if static electricity generated due to friction between air and the magnetic disk 5 rotating at a high speed moves to the spacer 1, static electricity on the spacer 1 diffuses, flows via the spindle 14 to an external portion, and gradually attenuates, and therefore both charging and discharging are unlikely to occur.

According to another aspect of the spacer 1, the spacer 1 contains at least one oxide selected from the group consisting of $TiO_2$, $Nb_2O_5$, $WO_3$, and $Bi_2O_3$. It is preferable to contain any of these oxides because these oxides can be easily reduced and facilitate an improvement in conductivity. It is preferable to further contain $P_2O_5$ in addition to the at least one oxide. $P_2O_5$ promotes reduction of the above-described four oxides. By adjusting the amount of at least one oxide selected from $TiO_2$, $Nb_2O_5$, $WO_3$, and $Bi_2O_3$, the surface resistivity within the above-described range of $10^3$ to $10^9$ [Ω/sq] can be realized. It should be noted that the surface resistivity is more preferably not higher than $10^8$ [Ω/sq], and further preferably not higher than $10^7$ [Ω/sq], from the above-described standpoint.

According to another aspect of the spacer 1, the spacer 1 contains $P_2O_5$, either $Li_2O$ or $Na_2O$, and at least one oxide selected from the group consisting of $TiO_2$, $Nb_2O_5$, $WO_3$, and $Bi_2O_3$.

It should be noted that glass in which minute particles of a conductive metal are dispersed and crystalized glass are not preferable for the spacer 1. These types of glass contain minute particles of a metallic component or a crystalline component, for example, and if the minute particles fall off from the surface of the glass, large recesses are formed in the surface. Minute foreign matter, such as dust, or particles are likely to accumulate in these recesses and these recesses are difficult to wash, and therefore there is a risk that the foreign matter or particles will contaminate surfaces of magnetic disks. From these standpoints, amorphous glass is preferable as the glass for the spacer 1.

According to yet another aspect of the spacer 1, the surface resistivity of a surface of the glass material of the spacer 1 at 22 [° C.] is lower than the surface resistivity of an inner portion of the glass material at 22 [° C.] If the surface resistivity differs between the surface and the inner portion as described above, specifically, if the surface has a lower surface resistivity than the inner portion, static electricity generated on the spacer 1 can be efficiently caused to flow to the spindle 14, which is in contact with the surface of the spacer 1 having a low surface resistivity. Also, there is the benefit of being able to manufacture the spacer 1 at low cost as described later because only the surface resistivity of the surface needs to be reduced. It should be noted that, in this case, the surface resistivity of the inner portion of the spacer 1 is $10^{10}$ [Ω/sq] or higher at 22 [° C.], for example. In order to realize such a configuration, conductivity of the surface can be improved by, for example, making the spacer 1 contain at least one oxide selected from the group consisting of $TiO_2$, $Nb_2O_5$, $WO_3$, and $Bi_2O_3$, as a glass component, and performing reduction treatment on a surface of a glass spacer blank from which the spacer 1 is to be obtained, as described later. It is preferable that $P_2O_5$ is contained in addition to the at least one oxide.

Namely, according to one embodiment regarding manufacture of the spacer 1, a glass spacer blank is manufactured as a blank from which a ring 1 to be arranged in contact with magnetic disks 5 in an HDD apparatus is to be obtained. The glass spacer blank can be manufactured using any method, such as a method of manufacturing a glass plate from molten glass, which is obtained by melting glass raw materials, using a float method, an overflow downdraw method, etc. and cutting the glass plate into a ring shape, a method of molding molten glass through pressing, or a method of manufacturing a glass tube through tube drawing and slicing the glass tube to a suitable length.

An edge surface (an outer circumferential edge surface or an inner circumferential edge surface) and main surfaces of the manufactured glass spacer blank are ground and/or polished.

Next, reduction treatment is performed on the surface of the glass spacer blank. This improves conductivity of the surface of the glass spacer blank. Namely, it is possible to obtain a spacer 1 in which the surface resistivity of the surface of the glass material at 22 [° C.] is lower than the surface resistivity of the inner portion of the glass material at 22 [° C.]. According to one embodiment, reduction treatment of the surface of the glass spacer blank can be performed by placing the glass spacer blank in a reducing gas atmosphere.

Here, the surface resistivity of the inner portion of the glass material can be obtained by measuring a sample including a surface that is newly formed by grinding the surface of the glass material to expose its inner portion, using the above-described method for measuring surface resistivity. It should be noted that volume resistivity is another parameter related to resistivity, but volume resistivity is measured with respect to the entirety of an object to be measured, and cannot be measured with respect to only resistance of the surface of the object. Also, the value of surface resistivity and the value of volume resistivity generally differ from each other. Furthermore, static electricity generated on magnetic disks can be conducted and released as a result of the magnetic disks and the spacer 1 being in contact with each other, and therefore the surface resistivity of the surface of the spacer 1 is important. Therefore, as for the spacer 1, using surface resistivity is more suitable than using volume resistivity.

According to one embodiment, the spacer 1 preferably contains at least one oxide selected from the group consisting of $TiO_2$, $Nb_2O_5$, $WO_3$, and $Bi_2O_3$, as a glass component. Accordingly, the glass spacer blank also preferably contains at least one oxide selected from the group consisting of $TiO_2$, $Nb_2O_5$, $WO_3$, and $Bi_2O_3$, as a glass component. It is more preferable that $P_2O_5$ is contained in addition to the at least one oxide.

In the case of $TiO_2$ for example, conductivity is improved as a result of $Ti^{4+}$ changing to $Ti^{3+}$ through reduction treatment. The presence of $Ti^{3+}$ can be confirmed using the Electron Spin Resonance (ESR) method, for example. In the case of other elements (tungsten, niobium, and bismuth) as well, conductivity is improved in a similar manner through reduction treatment.

An example of reduction treatment is subjecting the glass spacer blank, which is formed into a predetermined shape, to thermal treatment in a reducing atmosphere. Through such reduction treatment, reduction occurs on the surface of the glass spacer blank, and therefore the surface resistivity of the surface of the glass material can be reduced. Reduction treatment on the surface of the glass spacer blank can be performed at a low cost and more easily than reduction treatment on all of the glass the inner portion of the glass spacer, and therefore is preferable. Furthermore, the surface resistivity can be adjusted to fall within a desired range by adjusting conditions of reduction treatment. Examples of reducing gasses that can be used as the reducing atmosphere include hydrogen gas. The following describes details of a thermal treatment process performed on glass in a reducing atmosphere.

First, a glass spacer blank from which the spacer 1 is to be obtained is arranged in a vacuum gas replacement furnace and the pressure inside the furnace is reduced. Next, a reducing gas is introduced into the furnace. Then, the inside of the furnace is heated to a desired temperature and the temperature is maintained for about several minutes to dozens of hours to perform thermal treatment on the glass spacer blank. The temperature inside the furnace is preferably not higher than the softening point and at least a temperature (Tg–400° C.) lower than the glass transition temperature Tg by 400° C. in terms of reducing the treatment time. It should be noted that, as the temperature inside the furnace is increased and the treatment time is increased, effects of the reduction treatment increase, and accordingly the value of surface resistance can be reduced. Namely, the value of surface resistance can be adjusted by controlling the temperature inside the furnace and the treatment time.

If hydrogen gas is used as the reducing gas in the above-described thermal treatment process performed in the reducing atmosphere, the atmosphere inside the furnace may be replaced with a gas other than oxygen, such as nitrogen gas, before replacing the atmosphere with hydrogen gas. If the atmosphere inside the furnace is once replaced with nitrogen gas or the like to eliminate oxygen inside the furnace, ignition or the like can be prevented when hydrogen gas is thereafter introduced, and the inside of the furnace can be safely heated.

Also, the process for manufacturing the glass spacer blank (before the reduction treatment) may include a step of obtaining molten glass by melting glass in a reducing atmosphere. Preferably, the reducing atmosphere is a strong reducing atmosphere. In this case, conductivity can also be imparted to the inner portion of the glass spacer blank. In this case, the glass spacer blank can be used as is without being subjected to reduction treatment, and reduction treatment may be further performed. It should be noted that, if reduction treatment is not performed, the surface resistivity of the glass blank is $10^{10}$ [Ω/sq] or higher at 22 [° C.], for example.

An example of glass used for the above-described spacer 1 has the following glass composition.

$P_2O_5$ 37 mass % or less
$B_2O_3$ 5 mass % or less
$Li_2O$ 2 mass % or less
$N_2O$ 10 mass % or less
$K_2O$ 15 mass % or less
$TiO_2$ 45 mass % or less
$Nb_2O_5$ 60 mass % or less
$WO_3$ 50 mass % or less
$Bi_2O_3$ 38 mass % or less More preferably, the following glass composition can be employed, for example.

$P_2O_5$ 20 mass % or more and 30 mass % or less
$B_2O_3$ 1 mass % or less
$Li_2O$ 0.5 mass % or less
$N_2O$ 2 mass % or less
$K_2O$ 6 mass % or less
$TiO_2$ 20 mass % or more and 30 mass % or less
$Nb_2O_5$ 25 mass % or more and 40 mass % or less WO₃ 5 mass % or more and 20 mass % or less
Bi₂O₃ 5 mass % or less Specifically, the following glass composition can be employed, for example.

P₂O₅ 26.81 mass %
B₂O₃ 0 mass %
Li₂O 0.08 mass %
N₂O 0 mass %
K₂O 4.03 mass %
TiO₂ 26.04 mass %
Nb₂O₅ 31.76 mass %
WO₃ 11.29 mass %
Bi₂O₃ 0 mass %

In order to obtain glass having such a glass composition, a fluoride, an oxide, a hydroxide, a carbonate, and a nitrate that correspond to constitutional components of the glass were prepared as raw materials, weighed and blended such that the glass to be obtained had the above-described glass composition, and sufficiently mixed. The obtained blend of raw materials (raw material batch) was heated at 1300° C. for 2 to 3 hours to obtain molten glass. Water and a carbon-containing compound, namely a 0.1 wt % to 5 wt % aqueous ethanol solution was sprayed and added to the molten glass. Thereafter, the molten glass was stirred to be homogenized, clarified, and then poured into a mold preheated to an appropriate temperature. The cast glass was formed into a plate shape, subjected to thermal treatment at around the glass transition temperature Tg for about 1 hour, and cooled to the room temperature, and thus a glass plate was obtained.

Contents of glass components of the obtained glass plate were measured using Inductively Coupled Plasma Atomic Emission Spectroscopy (ICP-AES) to confirm the composition.

According to one embodiment, a surface roughness Ra of the main surfaces 4 of the spacer 1 is preferably not larger than 1.0 μm. The spacer 1 fixes the magnetic disks 5 using a frictional force while being in close contact with the magnetic disks 5, and the area of contact and the frictional force increase as the surface smoothness of the spacer 1 increases. From this standpoint, the surface roughness Ra of the main surfaces 4 is not larger than 1.0 μm, for example. Preferably, the surface roughness Ra is not larger than 0.5 μm. It should be noted that, as the surface roughness Ra of the main surfaces 4 of the spacer 1 is reduced, an adhesive force that acts between the spacer 1 and the magnetic disks 5 increases.

Here, Ra, Rz, and skewness Sk, which will be described as surface roughness parameters, conform to JIS B 0601-2001. Ra denotes the arithmetic average roughness and Rz denotes the maximum height. Surface roughness is calculated by, for example, using data that is measured using a stylus surface roughness measurement device in which a stylus is used. It should be noted that a stylus in which the radius of curvature of a leading end is 2 μm and the taper angle of a cone is 60° can be used. Other measurement/calculation parameters can be set as follows: a measurement length of 80 μm, a measurement resolution (pitch) of 0.1 μm, a scan speed of 0.1 mm/sec, a lowpass filter cut-off value (Ls) of 2.5 μm, and a highpass filter cut-off value (Lc) of 80 μm.

If the surface roughness parameters are measured using a stylus, surface roughness is measured by moving the stylus in the thickness direction of the spacer 1 to perform scanning. In this case, even if a large number of minute grooves that extend in the circumferential direction are formed in an entire edge surface of the spacer 1, surface roughness can be accurately evaluated. If scanning is performed by moving the stylus in the circumferential direction, which is the extension direction of the grooves, in measurement of this surface, it may be unable to evaluate irregularities formed by the grooves because the stylus is moved along the grooves. That is, if grooves that extend in one direction are formed in a surface to be measured, scanning is performed by moving the stylus in a direction that is perpendicular to the extension direction of the grooves.

With regard to each of the above-described surface roughness parameters, measurement is performed, for example, five times on a surface of a portion to be evaluated, and an average value of the thus obtained five values can be used as the value of the surface roughness parameter.

The outer circumferential edge surface 2 is an edge surface that does not come into contact with the magnetic disks 5 and the spindle 14. The surface roughness Rz, that is, the maximum height Rz of the outer circumferential edge surface 2, is preferably at least 1.5 μm. Preferably, the surface roughness Rz is not larger than 20 μm.

The surface roughness Rz of the outer circumferential edge surface 2 is set to be at least 1.5 μm so that the spacer 1 can be easily gripped and removed using a gripping jig of an assembly apparatus, when taking out a specific magnetic disk 5 from the HDD apparatus 10 in which the magnetic disks 5 and the spacers 1 are stacked as shown in FIG. 2 and are fitted to the spindle 14 of the HDD apparatus 10. In other words, the surface roughness Rz is set to be at least 1.5 μm in order to make the spacer 1 less likely to slip when the outer circumferential edge surface 2 of the spacer 1 is gripped by the gripping jig to remove the spacer 1 from the spindle 14. The magnetic disks 5 and the spacer 1 are fixed by being pressed against each other using the top clamp 16, and therefore the spacer 1 is likely to adhere to the magnetic disks 5, and a removal failure is likely to occur when removing the spacer 1 using the gripping jig of the assembly apparatus. If the surface roughness Rz is smaller than 1.5 μm, the number of removal failures sharply increases.

A surface roughness Rz larger than 20 μm increases the possibility that, when the spacer is gripped by the gripping jig, a surface of the gripping jig will be scraped by surface irregularities formed in the outer circumferential edge surface 2, and foreign matter, such as particles, will be generated. From this standpoint, it is preferable that the surface roughness Rz is not larger than 20 μm. In order to further reduce the possibility of generation of foreign matter, such as particles, it is more preferable that the surface roughness Rz is not larger than 10 μm.

Further, if the surface roughness Rz is smaller than 2.0 μm, there is a case in which, although a removal failure does not occur, particles are generated as a result of strong friction occurring in removal. Therefore, it is more preferable that Rz is at least 2.0 μm.

According to one embodiment, it is preferable that grooves (scratch marks) that extend along the outer circumference of the spacer 1 are formed in the outer circumferential edge surface 2. In other words, it is preferable that the grooves are formed extending in the circumferential direction in the outer circumferential edge surface 2 of the spacer 1. It is more preferable that the grooves are formed in the entire outer circumferential edge surface 2. If a chamfered surface is provided, the grooves need not be formed in the chamfered surface. Such grooves can increase the frictional force between the gripping jig of the assembly apparatus and the outer circumferential edge surface 2, and accordingly can further suppress the occurrence of a removal failure.

Such grooves can be seen using a laser optical microscope, an SEM, or the like.

It is preferable that an average width of the grooves is at least 10 μm in terms of ensuring a sufficient frictional force to avoid removal failures. On the other hand, if the grooves are too large, burrs are likely to be generated on ridge lines of protruding portions that are formed between the grooves. If there are burrs, particles are likely to be generated when the spacer is gripped, as described later in detail. Therefore, it is preferable that the average width of the grooves is not larger than 300 μm. The average width of the grooves can be roughly calculated based on the number of grooves that are formed within a predetermined length in the thickness direction of the outer circumferential edge surface 2. An average depth of the grooves is preferably not larger than 20 μm, and more preferably not larger than 10 μm.

It should be noted that, in some cases, the outer circumferential edge surface of the spacer is provided with about one to three recesses that extend in the circumferential direction, in order to prevent warping of the magnetic disks 5 during installation, for example. The depth of these recesses is generally at least 100 μm and is apparently larger than the depth of the above-described grooves (scratch marks), and the recesses can be easily visually recognized and can be distinguished from the above-described grooves (scratch marks). It should be noted that the above-described recesses and grooves (scratch marks) can be provided together. In this case, it is sufficient to provide the above-described grooves (scratch marks) at least in portions of the outer circumferential edge surface other than portions in which the recesses are provided.

According to one embodiment, it is preferable that the skewness Sk, which is a parameter that defines the shape of surface irregularities of the outer circumferential edge surface 2, is not larger than 1.2. If the skewness Sk is larger than 1.2, the surface has a shape in which sharp protruding shapes are relatively sparsely dispersed, and therefore it is highly likely that, when the spacer 1 is gripped, sharp protrusions will break or the surface of the gripping jig will be scraped, and foreign matter such as particles will be generated. Although the lower limit value of the skewness Sk is not specifically limited, it is −2, for example. That is, it is more preferable that the skewness Sk is in the range of −2 to +1.2. The skewness Sk is more preferably not larger than 0.5, and further preferably not larger than 0 in terms of reducing sharp protruding shapes.

In a case in which the above-described grooves (scratch marks) are formed in the outer circumferential edge surface 2, if there are large burrs on protruding portions between the grooves, the skewness Sk is likely to be larger than 1.2. From this standpoint as well, it is preferable that the skewness Sk is not larger than 1.2.

The skewness Sk is a dimensionless parameter that is obtained by dividing the cubic mean of measurement data of surface roughness by the cube of a root mean square height of the measurement data of surface roughness. The skewness Sk is used to evaluate symmetry between protruding shapes and valley shapes of surface roughness, and takes a positive value or a negative value. A larger positive value of the skewness Sk indicates surface irregularities that include a larger number of sharp protruding shapes and gentler valley shapes. If the skewness Sk takes a negative value, a larger absolute value of the skewness Sk indicates surface irregularities that include sharper valley shapes and a larger number of gentle protruding shapes.

If surface irregularities have skewness and surface roughness Rz within the predetermined ranges as described above, the frictional force between the gripping jig of the assembly apparatus and the outer circumferential edge surface 2 can be increased to suppress the occurrence of removal failures when removing the spacers 1 and suppress generation of foreign matter such as particles.

Each magnetic disk 5 arranged in contact with the spacer 1 is preferably obtained by forming a magnetic film on a glass substrate. If both the spacer 1 and the magnetic disk 5 are constituted by glass materials, the amount of thermal expansion is substantially the same between the spacer 1 and the magnetic disk 5, and it is possible to suppress generation of particles, which is caused if the spacer 1 and the magnetic disk 5 are displaced relative to each other due to a difference in thermal expansion.

Furthermore, the spacer 1 fixes the magnetic disks 5 using a frictional force while being in close contact with the magnetic disks 5, and therefore, according to one embodiment, the surface roughness Ra of main surfaces of the magnetic disks 5 in contact with the spacer 1 is preferably not larger than 0.3 [nm] in terms of increasing the area of contact and the frictional force.

The above-described spacer 1 is preferably used in an HDD apparatus in which eight or more magnetic disks 5 are installed. If eight or more magnetic disks 5, which is more than six magnetic disks 5 that are normally installed in an HDD apparatus, are installed in an HDD apparatus, the magnetic disks 5 and the spacers 1 need to be more strongly pressed (clamped) against each other using the top clamp 16, and therefore a pressing force applied by the top clamp 16 needs to be increased. As a result, an adhesive force acting between the spacers 1 and the magnetic disks 5 installed in the HDD apparatus is increased. However, if the spacers 1 and the magnetic disks 5 are displaced relative to each other due to a difference in thermal expansion, particles are likely to be generated because the above-described pressing force is large. For the same reason, the spacer 1 of this embodiment is more preferably used in an HDD apparatus in which nine or more magnetic disks 5 are installed, and further preferably used in an HDD apparatus in which ten or more magnetic disks 5 are installed.

Example 1

In order to confirm the effects of the spacer 1, the spacer 1 was manufactured and the following experiment was conducted.

The manufactured spacer 1 had an inner diameter of 25 mm, an outer diameter of 32 mm, and a thickness of 2 mm, and included a chamfered surface that had an angle of 45° and a width in a radial direction of 150 μm.

The spacer 1 was manufactured by cutting a glass plate, which was manufactured using a glass material containing the above-described oxide, into a ring shape and then grinding and polishing the ring-shaped glass plate such that edge surfaces and main surfaces thereof had surface roughness, such as Ra and Rz, within predetermined ranges. Thereafter, reduction treatment was performed on the entire surface of the spacer 1 by performing thermal treatment in a hydrogen atmosphere. Namely, a spacer 1 subjected to reduction treatment was used.

Also, in order to obtain information regarding the surface resistivity ρs of the manufactured spacer 1, a bulk glass plate having the same glass composition as the spacer 1 containing the above-described oxide was manufactured. The glass plate was cut into a predetermined shape, and main surfaces of the glass plate were ground and polished similarly to the spacer 1 to make the glass plate have the same thickness as the spacer 1 and make the main surfaces of the glass plate have a surface roughness equal to that of the main surfaces of the spacer 1, and thereafter reduction treatment was performed on the entire surface of the glass plate by performing thermal treatment in a hydrogen atmosphere, whereby a test piece was obtained.

The surface resistivity ρs of the test piece was obtained by measuring resistance Rs using the measurement method shown in FIG. 4. The applied voltage was 100 [V], D was 38.1 mm, d was 25.4 mm, the outer diameter of the annular electrode 24 was 50.8 mm, the diameter of the counter electrode 22 was 50 mm, and the main electrode 20, the counter electrode 22, and the annular electrode 24 were formed using a conductive paste. The surface resistivity ρs obtained through the measurement was $4.2 \times 10^7$ [Ω/sq] at 22 [° C.]. At this time, the surface resistivity ρs of a central portion in the thickness direction was $2.7 \times 10^{10}$ [Ω/sq].

Seven manufactured spacers 1 were installed in an HDD apparatus by inserting the spacers between eight magnetic disks made of glass (coated with a magnetic film etc.), and the HDD apparatus was continuously operated for one week in a constant-temperature constant-humidity chamber while causing magnetic heads to perform a seek operation, and it was found that no issue occurred. Specifically, breakdown of the HDD apparatus as a result of foreign matter etc. being attached to electrostatically charged magnetic disks and sandwiched between the magnetic heads and the magnetic disks did not occur. Also, electrostatic breakdown of the magnetic heads as a result of micro discharge occurring between the magnetic heads and the magnetic disks did not occur. That is, it was confirmed that electrostatic charging of the magnetic disks 5 and the spacers 1 could be suppressed when the spacers 1 were used in the HDD apparatus.

Examples 2 to 6

Spacers 1 and test pieces having the same glass composition as the spacers 1 and the test piece manufactured in Example 1 were manufactured while varying conditions (the temperature inside the furnace and the treatment time) of reduction treatment to examine changes in the surface resistivity ρs of surfaces and inner portions of the test pieces (Examples 2 to 6). In order to measure the surface resistivity ρs of the inner portions, surfaces of the test pieces were ground and polished to expose and measure central portions in the thickness direction. Measurement results including that of Example 1 were as shown in Table 1 below.

TABLE 1

| | Surface Resistivity [Ω/sq] | |
|---|---|---|
| Example | Surface | Inner Portion |
| 1 | $4.2 \times 10^7$ | $2.7 \times 10^{10}$ |
| 2 | $1.1 \times 10^3$ | $2.7 \times 10^{10}$ |
| 3 | $3.5 \times 10^4$ | $2.7 \times 10^{10}$ |
| 4 | $6.1 \times 10^5$ | $2.7 \times 10^{10}$ |
| 5 | $4.8 \times 10^6$ | $2.7 \times 10^{10}$ |
| 6 | $9.5 \times 10^8$ | $2.7 \times 10^{10}$ |

With respect to each of Examples 2 to 6 shown in Table 1, seven manufactured spacers 1 were installed in an HDD apparatus by inserting the spacers between eight magnetic disks made of glass (coated with a magnetic film etc.), and the HDD apparatus was continuously operated for one week in a constant-temperature constant-humidity chamber while causing magnetic heads to perform a seek operation, and it was found that no issue occurred. Specifically, breakdown of the HDD apparatus as a result of foreign matter etc. being attached to electrostatically charged magnetic disks and sandwiched between the magnetic heads and the magnetic disks did not occur. Also, electrostatic breakdown of the magnetic heads as a result of micro discharge occurring between the magnetic heads and the magnetic disks did not occur. That is, it was confirmed that electrostatic charging of the magnetic disks 5 and the spacers 1 could be suppressed as a result of the surface resistivity of the surfaces of the spacers 1 being set to $10^3$ to $10^9$ [Ω/sq], which was lower than the surface resistivity of the inner portions, by varying conditions of reduction treatment.

Although the glass spacer, the hard disk drive apparatus, and the method for manufacturing the glass spacer of the present invention have been described in detail, the present invention is not limited to the above-described embodiment, examples, etc., and it goes without saying that various modifications and changes can be made within a scope not departing from the gist of the present invention.

The invention claimed is:

1. A ring-shaped glass spacer to be arranged in contact with a magnetic disk in a hard disk drive apparatus,
   wherein a glass material of the glass spacer has a surface resistivity of $10^3$ to $10^9$ (Ω/sq) at 22 (° C.), and
   a surface resistivity of a surface of the glass material of the glass spacer at 22 (° C.) is lower than a surface resistivity of an inner portion of the glass material at 22 (° C.).

2. The glass spacer according to claim 1,
   wherein grooves that extend along an outer circumference of the glass spacer are formed in an outer circumferential edge surface of the glass spacer that does not come into contact with the magnetic disk.

3. The glass spacer according to claim 1,
   wherein a skewness of an outer circumferential edge surface of the glass spacer that does not come into contact with the magnetic disk is not larger than 1.2.

4. The glass spacer according to claim 2,
   wherein a skewness of an outer circumferential edge surface of the glass spacer that does not come into contact with the magnetic disk is not larger than 1.2.

5. A ring-shaped glass spacer to be arranged in contact with a magnetic disk in a hard disk drive apparatus,
   wherein a glass material of the glass spacer has a surface resistivity of $10^3$ to $10^9$ (Ω/sq) at 22 (° C.), and
   a surface roughness Rz of an outer circumferential edge surface of the glass spacer that does not come into contact with the magnetic disk is at least 1.5 μm.

6. The glass spacer according to claim 5,
   wherein the glass spacer contains at least one oxide selected from the group consisting of $TiO_2$, $Nb_2O_5$, $WO_3$, and $Bi_2O_3$, as a glass component.

7. The glass spacer according to claim 6,
   wherein a surface roughness Ra of a main surface of the glass spacer that comes into contact with the magnetic disk is not larger than 1.0 μm.

8. The glass spacer according to claim 5,
   wherein the surface roughness Rz of the outer circumferential edge surface is not larger than 20 μm.

9. A hard disk drive apparatus comprising
   the glass spacer according to claim 5 and the magnetic disk.

10. The hard disk drive apparatus according to claim 9,
wherein the magnetic disk includes a glass substrate and a magnetic film that is formed on the glass substrate.

11. The glass spacer according to claim 5,
wherein a surface resistivity of a surface of the glass material of the glass spacer at 22 (° C.) is lower than a surface resistivity of an inner portion of the glass material at 22 (° C.).

12. The glass spacer according to claim 5,
wherein grooves that extend along an outer circumference of the glass spacer are formed in an outer circumferential edge surface of the glass spacer that does not come into contact with the magnetic disk.

13. The glass spacer according to claim 11,
wherein grooves that extend along an outer circumference of the glass spacer are formed in an outer circumferential edge surface of the glass spacer that does not come into contact with the magnetic disk.

14. The glass spacer according to claim 5,
wherein a skewness of an outer circumferential edge surface of the glass spacer that does not come into contact with the magnetic disk is not larger than 1.2.

15. The glass spacer according to claim 11,
wherein a skewness of an outer circumferential edge surface of the glass spacer that does not come into contact with the magnetic disk is not larger than 1.2.

16. The glass spacer according to claim 12,
wherein a skewness of an outer circumferential edge surface of the glass spacer that does not come into contact with the magnetic disk is not larger than 1.2.

17. The glass spacer according to claim 13,
wherein a skewness of an outer circumferential edge surface of the glass spacer that does not come into contact with the magnetic disk is not larger than 1.2.

18. A ring-shaped glass spacer to be arranged in contact with a magnetic disk in a hard disk drive apparatus,
wherein a glass material of the glass spacer has a surface resistivity of $10^3$ to $10^9$ (Ω/sq) at 22 (° C.), and
grooves that extend along an outer circumference of the glass spacer are formed in an outer circumferential edge surface of the glass spacer that does not come into contact with the magnetic disk.

19. The glass spacer according to claim 18,
wherein a skewness of an outer circumferential edge surface of the glass spacer that does not come into contact with the magnetic disk is not larger than 1.2.

20. A ring-shaped glass spacer to be arranged in contact with a magnetic disk in a hard disk drive apparatus,
wherein a glass material of the glass spacer has a surface resistivity of $10^3$ to $10^9$ (Ω/sq) at 22 (° C.), and
a skewness of an outer circumferential edge surface of the glass spacer that does not come into contact with the magnetic disk is not larger than 1.2.

* * * * *